(12) United States Patent
Krishnaswamy et al.

(10) Patent No.: US 8,041,765 B1
(45) Date of Patent: Oct. 18, 2011

(54) METHOD AND APPARATUS PROVIDING SENDER INFORMATION BY WAY OF A PERSONAL VIRTUAL ASSISTANT (PVA)

(75) Inventors: Venkatesh Krishnaswamy, Holmdel, NJ (US); Timothy Ian Ross, Fair Haven, NJ (US); Rajeshwari Edamadaka, Allentown, NJ (US); Jack Iu, South Plainfield, NJ (US); Krishna Kishore Dhara, Dayton, NJ (US)

(73) Assignee: Avaya Inc., Basking Ridge, NJ (US)

( * ) Notice: Subject to any disclaimer, the term of this patent is extended or adjusted under 35 U.S.C. 154(b) by 469 days.

(21) Appl. No.: 12/038,521

(22) Filed: Feb. 27, 2008

Related U.S. Application Data (60) Provisional application No. 60/930,909, filed on May 17, 2007.

(51) Int. Cl.
*G06F 15/16* (2006.01)
(52) U.S. Cl. ......................................... 709/204; 709/206
(58) Field of Classification Search .................... 709/204
See application file for complete search history.

(56) References Cited

U.S. PATENT DOCUMENTS

| | | | |
|---|---|---|---|
| 2002/0054072 A1* | 5/2002 | Hayes-Roth | 345/727 |
| 2004/0015699 A1* | 1/2004 | Thomas et al. | 713/179 |
| 2005/0223072 A1* | 10/2005 | Greve et al. | 709/206 |
| 2008/0205608 A1* | 8/2008 | Tal et al. | 379/93.01 |
| 2009/0049139 A1* | 2/2009 | Fouotsop et al. | 709/206 |

* cited by examiner

*Primary Examiner* — Jeffrey Pwu
*Assistant Examiner* — Shaq Taha
(74) *Attorney, Agent, or Firm* — Chapin IP Law, LLC; David W. Rouille, Esq.

(57) ABSTRACT

A method, apparatus and computer program product for providing additional information related to a sender of a communication is presented. A communication intended for a recipient is received, the communication including information related to the sender of the communication. A Personal Virtual Assistant (PVA) acquires in real time additional information related to the sender of the communication. The additional information related to the sender of the communication is then presented to the recipient attached to the communication where possible. The PVA is capable of acting on the recipient's real time instructions relating to the additional information.

21 Claims, 5 Drawing Sheets

METHOD AND APPARATUS PROVIDING SENDER INFORMATION BY WAY OF A PERSONAL VIRTUAL ASSISTANT (PVA)

CROSS REFERENCE TO RELATED APPLICATIONS

The present application claims the benefit of U.S. Provisional Patent Application No. 60/930,909, filed on May 17, 2007, which is incorporated herein by reference in its entirety.

BACKGROUND

Many professionals, such as physicians, attorneys, sales representatives and others often find it difficult to communicate with clients, customers, colleagues and assistants. These professionals typically employ human assistants to relay important information, maintain their schedules and filter out all unnecessary interruptions. A virtual assistant is a computer application that allows the professional to access personal, company, and public information, including contacts, schedules, and databases from any interactive device, such as a telephone, laptop computer or Personal Digital Assistant (PDA).

One important function provided by a virtual assistant, which is also used ubiquitously by busy professionals who do not have a virtual assistant, is voice mail. Navigating large databases of non-messaging information, such as a contacts database is also quite cumbersome and difficult with conventional voicemail systems and virtual assistants, particularly, when the database is large and the user is attempting to access the database with a voice user interface.

While the deskbound worker has become even more empowered, the typical mobile worker has a cellular telephone (cell phone) and a laptop computer. Easily getting access to corporate data and managing communication with others, especially while in transit, can be extremely challenging. One solution to the needs of a mobile worker was realized in the form of a proxy, or Personal Virtual Assistant (PVA), which was available to the user and could help manage and coordinate communications and data access.

To a large degree, conventional PVAs allowed a worker, using only their voice and a cell phone, to have the capabilities of email (e.g., Microsoft Outlook) and a multi-function phone (plus some) as they would have had had they been sitting at their desk. These capabilities included email features such as read/annotate/forward/email messages, including attachments and finding messages based on sender, status (read, unread), type (email, voice mail, meeting request), priority etc. PVAs also allowed a user to listen to/forward/return voice mail messages and to accept meeting requests, list meetings, book meetings and the like. PVAs also allowed a user to manage tasks and to call personal and corporate contacts.

Conventional PVAs also allowed a remote worker to utilize phone features. These features include placing outbound calls—initiate calls in response to a voicemail (e.g. 'return this call'), using a personal or corporate contact or just by saying and keying in a number. A user was also permitted to receive calls with call screening—if the user was in a PVA Session then the user would be alerted of the inbound call and be allowed to talk to that caller (separately or as part of a conference call) or send them to voice mail. The remote user was also able to initiate conference calls and still be able to control each leg of conference. Additional capabilities were also provided.

SUMMARY

Conventional voicemail systems, as well as virtual assistants with voicemail functionality, however, have disadvantages that limit their usefulness. For example, a professional, such as a physician or an attorney, is a person that many people attempt to contact throughout the day. Such persons, however, cannot for various reasons be reached directly by telephone. The busy professional needs to sort through these interruptions and easily figure out which ones he/she needs to attend to. Thus, many such professionals have voicemail. If the professional is not able to regularly access his or her voicemail, at the end of the day, or whenever the voicemail is accessed, the number of voicemail messages may be so large as to be virtually unmanageable because the only option is to listen to the messages one at a time in sequential fashion. This can cause the voicemail user to simply abandon use of the voicemail system because the user does not have time to listen to a large number of messages one at a time. This makes it even more difficult for persons attempting to contact the busy professional, the only remaining options being to contact the professional in person, which may be impractical, sending a page, sending an email or other know contact methods. If the volume of pages or emails becomes so great, the cycle is repeated.

Embodiments of the invention significantly overcome such deficiencies and provide mechanisms and techniques that provide a PVA which provides additional information relating to a sender of a communication.

In a particular embodiment of a method providing additional information related to a sender of a communication, the method includes receiving a communication intended for a recipient, the communication including information related to the sender of the communication. The method further includes acquiring, in real time by way of a Personal Virtual Assistant (PVA), additional information related to the sender of the communication and presenting the additional information related to the sender of the communication to the recipient. The PVA is capable of acting on the recipient's real time instructions relating to the additional information.

The PVA of the present invention is more passive and behaves as per instructions of the user (recipient); e.g., doesn't answer the call automatically—it offers menus to user and takes user's selection and then executes it (one execution may be to answer call and play a custom menu/announcement and interact with the caller as the user's proxy) while staying in touch with the user giving notifications of the progress between the PVA and the Caller. This interactive behavior with user while executing an action with caller is unique. IT should also be noted that the PVA is not solely Voice focused and will exploit multiple modalities wherever available (e.g.; visual menus on screen). The PVA is also reachable similarly in its own right in a multiple modal manner (IM, call etc). The PVA is capable of offering choices of actions that PVA can perform in relation to the call as well e.g. hold on for a bit, schedule callback, help user interact with caller, all while keeping user updated about progress. So PVA allows user to handle communications, interruption and work more efficiently. The PVA is passive and that it is adding the relevant data onto the call itself because of special endpoints that have IPTML, otherwise the information pops up as a web page at the same time the call is ringing (with softphones or smart mobile phones or in tandem with a device that can display web content e.g. a PC running a browser or a deskphone that has a web browser in it).

Other embodiments include a computer readable medium having computer readable code thereon for providing additional information related to a sender of a communication. The computer readable medium includes instructions for receiving a communication intended for a recipient, the communication including information related to the sender of the communication. The computer readable medium further includes instructions for acquiring, by way of a Personal Virtual Assistant (PVA), additional information related to the sender of the communication, and instructions for presenting the additional information related to the sender of the communication to the recipient.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides additional information relating to a sender of a communications as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing additional information relating to a sender of a communications as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

As used herein, a Personal Virtual Assistant includes a virtual assistant that may be active or passive, is multi-modal and multi-device in its ability to interface with a variety of communications platforms, executes in parallel with any and all communications platforms, and executes in real time, such that it offers and accepts a variety of real-time context-specific commands/options to a user, and then acts as a proxy to execute those commands/options with the sender(s) of a communication.

A Personal Virtual Assistant (PVA) comprises a unified communications application which is able to provide a user with assistance in handling interruptions, missed communications, outgoing calls, scheduling, and prioritizing communication tasks. The communications to and from the user can be of any style, including but not limited to, telephone calls (landline and cellular), instant messages (IMs), text messages and e-mails.

The PVA includes a set of Internet Protocol (IP) telephony enhancements that support a communications intensive work-style or role. PVA integrates easily into a user's desk phone, mobile phone, desktop computer, laptop computer, and email program (e.g., Microsoft Outlook® available from Microsoft Corporation).

Figure 1:
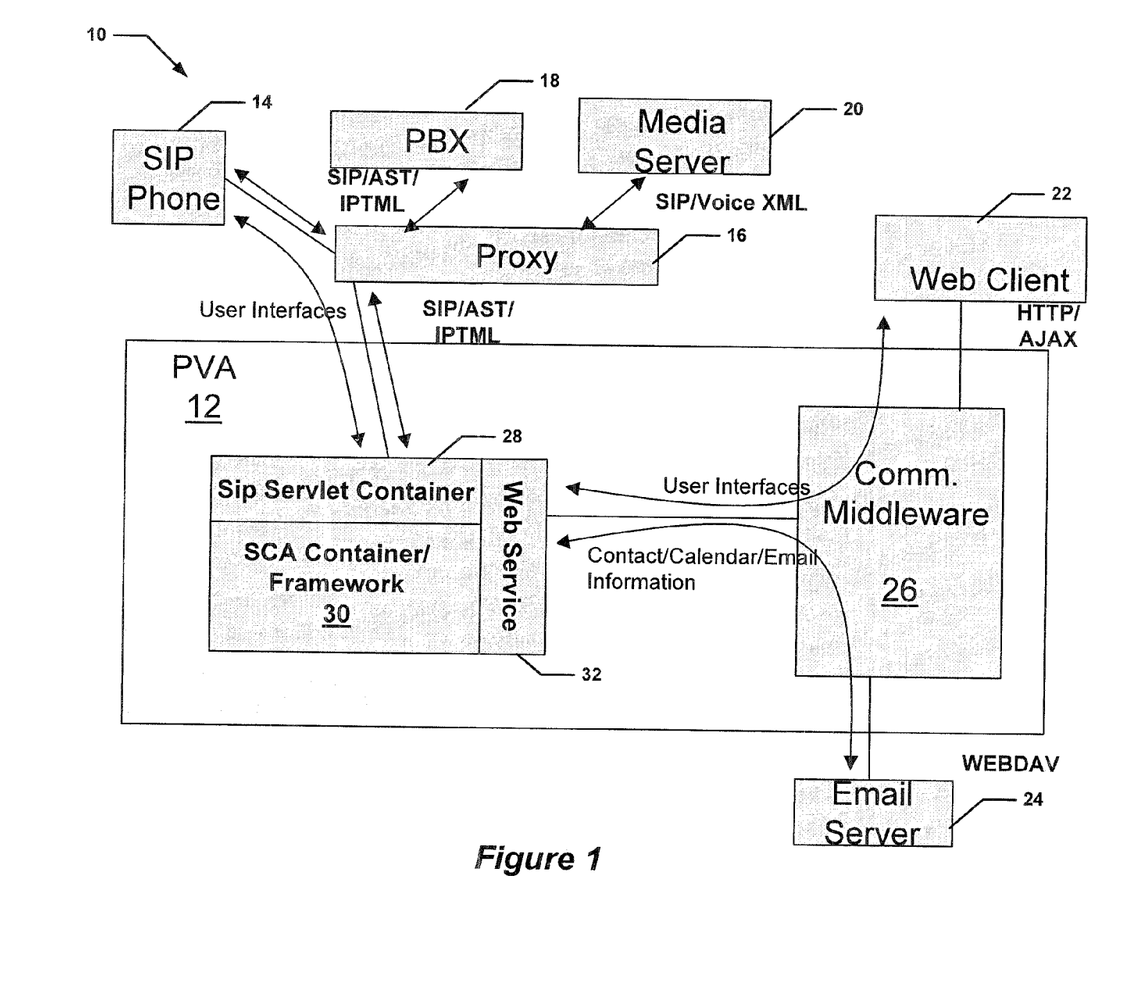
FIG. 1 depicts a block diagram of showing various components and interfaces of a Personal Virtual Assistant in accordance with embodiments of the invention.

Referring now to FIG. 1, a particular embodiment of a PVA environment 10 in accordance with embodiments of the invention is shown. The PVA environment 10 includes a PVA 12 in communication with a SIP phone 14, a Proxy 16, Communications middleware 22 and an email server 24.

The Proxy 16 is in communication with a PBX 18 and a media server 20. Communication between PVA 12 and Proxy 16 is via a common protocol, for example Session Initiation Protocol (SIP), Advanced SIP Telephony (AST) or Internet Protocol Terminal Markup language (IPTML).

The PVA 12 includes a SIP servlet container 28, an Service Component Architecture (SCA) Continuer or Framework 30 and a Web Service 32. PVA 12 also includes Communication Middleware 26, which is a web-based software solution that provides users with control of telephony, conferencing, messaging, mobility administration, and access to corporate and personal contact information. The Communication Middleware 26 consolidates access to all the critical voice applications that a user needs. The Communication Middleware 26 allows the use of the desk phone while in the office and supports remote workers from any location. Communication Middleware 26 can be used by any employee from any Internet connection if they cannot get to an office location in the event of a business interruption. In this configuration the Communication Middleware 26 is used to communicate with the Email server 24 for obtaining contact/calendar/email information for PVA 12 and also to the Web client 32 by HyperText Transfer Protocol (HTTP) or AJAX. AJAX, which stands for asynchronous JavaScript and XML, is a conglomerate technology that enables dynamic, asynchronous behavior on Web pages without the need for browser page refreshes.

The PVA 12 works by attaching to the user's calls by bridging to the user's phone or by the sequenced applications determining features for an incoming or outgoing call for a particular user extension. The PVA 12 can thus observe incoming and outgoing calls, and can answer on the user's behalf. The PVA 12 maintains an information and control channel to the user.

The PVA 12 displays choices; acts on selections, and provides updates on actions being taken. Information regarding the communication, along with the communication itself, can be displayed on a phone screen, desktop or other device being used by the user.

PVA 12 is configured to act as a delegate on the user's email client, and therefore can securely access email and calendar information, subject to user's control. PVA 12 can be used to obtain information on meeting details. PVA can also be used to connect the user to the meeting and/or to relay a message saying that user will be late for the meeting.

When an incoming communication arrives, the PVA 12 provides an automated communication assisting process which renders information on a graphical user interface for the recipient (user) to view. The automated communication assisting process provides choices to the recipient via interruption management. The automated communication assisting process displays additional information about the sender of the communication.

In an example embodiment, the automated communication assisting process automatically displays the additional information about the sender of the communication as soon as the communication arrives at a recipient. In another example embodiment, the recipient may choose whether or not this additional information (about the sender of the communication) is displayed when the communication arrives, or whether this additional information (about the sender of the communication) is displayed when the recipient chooses to view the additional information about the communication. In another example embodiment the automated communication assisting process performs a search to identify the sender of the communication, and provides the recipient with information discovered during the search. For example, the search may be an online search, a database search, etc. of the person or the person's company. Other information may also be provided, including, but not limited to, an electronic business card (Vcard) of the sender of the communication, performing a reverse phone lookup of the sender of the communication and providing a picture of the sender of the communication and/or providing a ranking of the sender of the communication, or can be information mined about the person in the enterprise (e.g., skills, department, any enterprise or social web pages, industry affiliations etc.).

Figure 2:
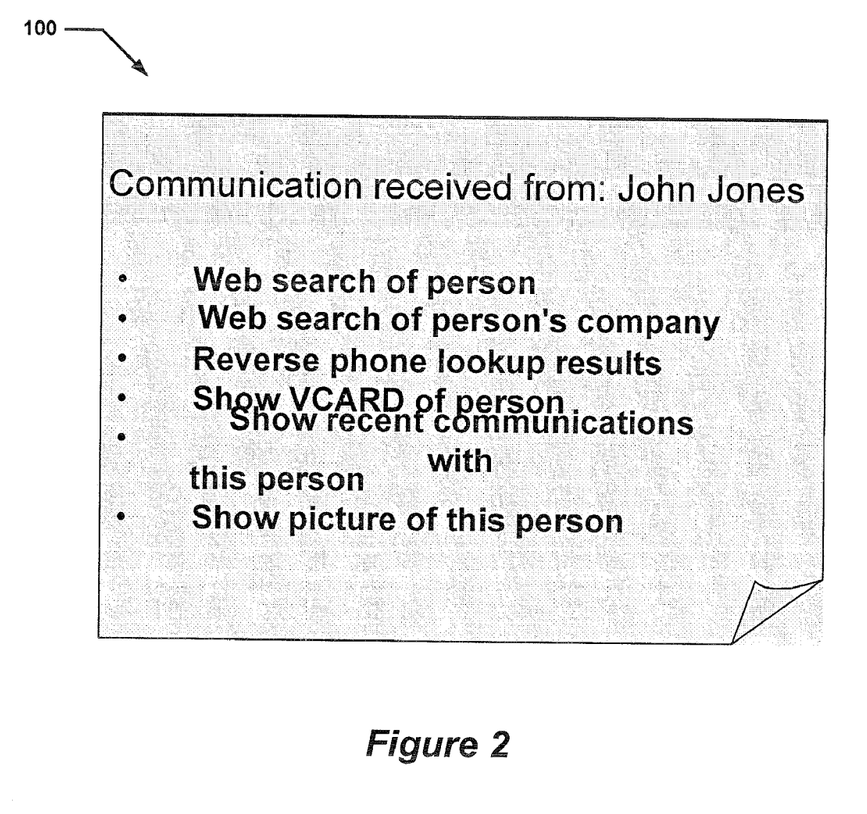
FIG. 2 depicts different options presented to a user regarding additional information relating to a sender of a communication.

FIG. 2 shows an example result of the PVA providing additional information regarding a sender of a communication to the user. In this example the user is presented with a pop-up 100 relating to the sender of the communication. The communication from the sender to the user may take the form of a telephone call, an e-mail, a text message or an instant message (textual, audio or video). Different information regarding the sender of the communication may be made available to user as part of the original communication. For example, a telephone call may include a caller-id which indicates the person placing the call, an email may include the name and email address of the sender of the communication and may further include the persons company name, phone number and website.

The user is presented with additional information regarding the sender of the communication by the PVA 12. Since the PVA sits more or less in parallel with the user, the PVA also receives the communication and can perform one or more tasks to obtain additional information relating to the sender of the communicating. This additional information may be useful to the user in determining whether to respond to the communication immediately, at a later time, or not at all. Since the PVA is a bridged extension or is in the application routing sequence, the PVA can trigger user's features (e.g., send to User's VM, forward call on as though the user initiated this action themselves).

As shown in FIG. 2, when a communication arrives, the PVA presents a plurality of options 100 to the recipient of the communication. The options may include a web search of the person. Here, the PVA conducts a web search, such as a Google search of the person's name, and permits the user to view the search results. Another option is a web search of the person's company. Similar to the web search of the person the PVA conducts a web search, such as a Google search of the person's company, or can be information mined about the person in the enterprise (e.g. skills, department, any enterprise or social web pages, industry affiliations etc) and permits the user to view the search results.

The PVA, when the communication is by telephone, can conduct a reverse phone lookup to obtain caller information. The PVA may also show a Vcard of the person, or a picture of the person, if such information is available. The information may be generated automatically and presented to the user when a communication is received, or the communication is received and then the user is presented with a list of options which can be performed in order to acquire additional information regarding the sender of the communication.

Yet another option is for the VPA to show recent communications with this person. This can include the number of e-mails, the number of telephone calls and the number of voice mails received over a predetermined time period (e.g., the last two days).

The sender of the communication may also be ranked with relation to other senders of communications. The ranking may take into account factors including, but not limited to, relative importance, whether the sender is a family member, previous communications with the sender, the sender's position, importance assigned by user and the like.

After the call with the caller, the PVA also presents after-call menus:

1—If the caller is a new person; the PVA asks user to select importance (VIP, personal, Blacklist, etc.) and can create a new contact or merge with existing contact but add this new number as the existing contact's mobile number for example.

2—The PVA can also notice that there was a pending daily call list task with same person and can then ask if this task is completed or not and act accordingly.

Figure 3:
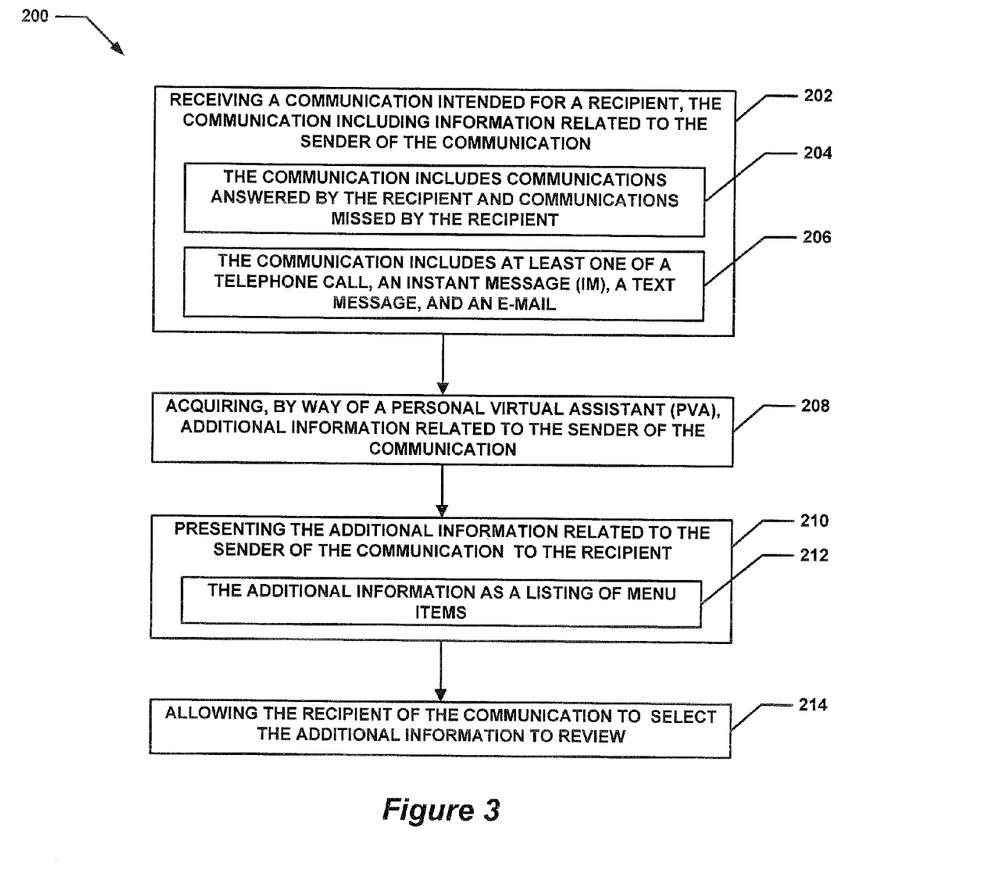
FIG. 3 depicts a flow diagram of a particular embodiment of a method of providing additional information related to a sender of a communication in accordance with embodiments of the invention.
Figure 4:
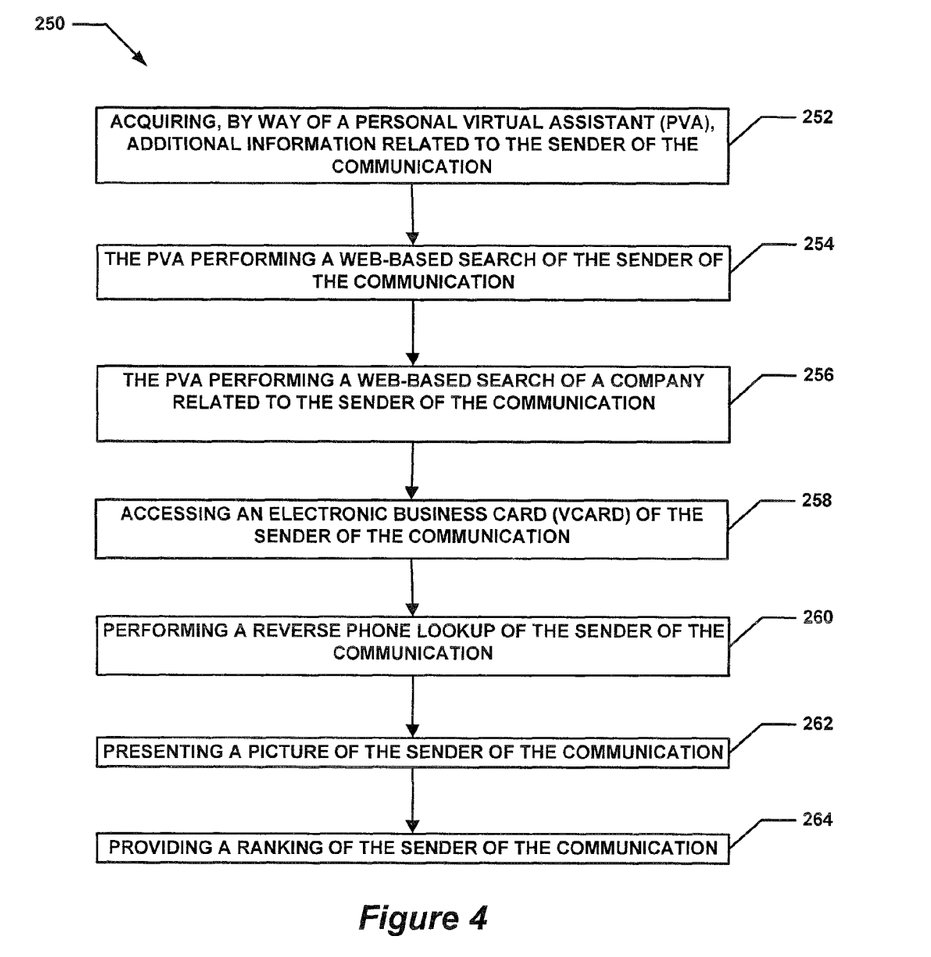
FIG. 4 depicts flow diagram of a particular embodiment of a method of acquiring additional information related to a sender of a communication in accordance with embodiments of the invention.

Flow charts of particular embodiments of the presently disclosed methods depicted in FIGS. 3 and 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 200 of providing additional information related to a sender of a communication is shown. Method 200 begins with processing block 202 which discloses receiving a communication intended for a recipient, the communication including information related to the sender of the communication. As further recited in processing block 204, the communication includes communications answered by the recipient and communications missed by the recipient. Additionally, as shown in processing block 206, the communication includes at least one of a telephone call, an Instant Message (IM), a text message, and an e-mail.

Processing block 208 states acquiring, in real time by way of a Personal Virtual Assistant (PVA), additional information related to the sender of the communication. Details regarding what the additional information can include are presented below in the description of the flow diagram 250 of FIG. 4.

Processing block 210 recites presenting the additional information related to the sender of the communication to the recipient. Processing block 212 discloses that in one embodiment, presenting the additional information related to the sender of the communication to the recipient comprises presenting the additional information as a listing of menu items. An example of this is shown in FIG. 2. Additionally, the additional information related to the sender of the communication to the recipient can be presented in various forms, including but not limited to a listing of menu items, a web page, a listing of icons, a table form, and tabs of a web page.

As shown in processing block 214, the PVA is capable of acting on the recipient's real time instructions relating to the additional information. Processing block 216 discloses once the recipient of the communication has been presented with the additional information relating to the sender of the communication, the recipient of the communication can select the additional information to review. For example, if the recipient of the communication is unfamiliar with the sender of the communications, the recipient could click on the "Web search of person" option and obtain the results of a Google search of the sender's name, such that the recipient of the communication has a better idea regarding who the sender of the communication is and what the communication may be about.

Referring now to FIG. 4, a particular embodiment of a method 250 of obtaining information regarding the sender of a communication is shown. Method 250 begins with processing block 252 which discloses acquiring, by way of a Personal Virtual Assistant (PVA), additional information related to the sender of the communication. As described below, this can occur in several different ways, and at different times. For example, in one embodiment, the information may be acquired then presented to the recipient, whereas in another embodiment the information may be presented after requested by the recipient. Further, while specific types of information may be determined, it should be understood that other types of information may also be provided by the PVA regarding the sender of the communication, and should not be limited to only the information described below.

Processing block 254 states wherein the acquiring, by way of a Personal Virtual Assistant (PVA), additional information related to the sender of the communication comprises the PVA performing a web-based search of the sender of the communication. In one example a Google search of the sender's name is performed, and the results made available to the recipient of the communication.

Processing block 256 recites wherein the acquiring, by way of a Personal Virtual Assistant (PVA), additional information related to the sender of the communication comprises the PVA performing a web-based search of company related to the sender of the communication. In one example a Google search of the sender's company is performed, and the results made available to the recipient of the communication.

Processing continues with processing block 258 which discloses wherein the acquiring, by way of a Personal Virtual Assistant (PVA), additional information related to the sender of the communication comprises accessing an electronic business card (Vcard) of the sender of the communication. A prior email may have been received from the sender which included the sender's electronic business card (Vcard). This may provide information relating to the person's position within their company.

Processing block 260 states wherein the acquiring, by way of a Personal Virtual Assistant (PVA), additional information related to the sender of the communication comprises performing a reverse phone lookup of the sender of the communication. A reverse telephone lookup directory allows users to search by a telephone service number in order to retrieve the customer details for that service. Other types of searches are also applicable (e.g., reverse search by email address, by name on the web, by social networking pages and the like).

Processing block 262 discloses wherein the acquiring, by way of a Personal Virtual Assistant (PVA), additional information related to the sender of the communication comprises presenting a picture of the sender of the communication. A previously received picture of the sender of the communication is presented to the user.

Processing block 264 discloses wherein the acquiring, by way of a Personal Virtual Assistant (PVA), additional information related to the sender of the communication comprises providing a ranking of the sender of the communication. The sender of the communication is ranked with relation to other senders of communications. The ranking may take into account factors including, but not limited to, relative importance, whether the sender is a family member, previous communications with the sender, the sender's position, and the like. Examples and descriptions of these are provided in the following co-pending patent applications: Ser. No. 12/038,432 titled NEGOTIATION OF A FUTURE COMMUNICATION BY USE OF A PERSONAL VIRTUAL ASSISTANT (PVA), Ser. No. 12/038,470 titled ASSISTING A USER, BY WAY OF A PERSONAL VIRTUAL ASSISTANT (PVA), IN RESPONDING TO COMMUNICATIONS; Ser. No. 12/038,494 titled ASSISTING A USER, BY WAY OF A PERSONAL VIRTUAL ASSISTANT (PVA), IN COMPLETING ONE OR MORE COMMUNICATION-BASED TASKS; and Ser. No. 12/038,537 titled METHOD AND APPARATUS PROVIDING MEETING CONTEXT INFORMATION, all filed on even date herewith, the disclosures of which are incorporated by reference in their entirety.

Figure 5:
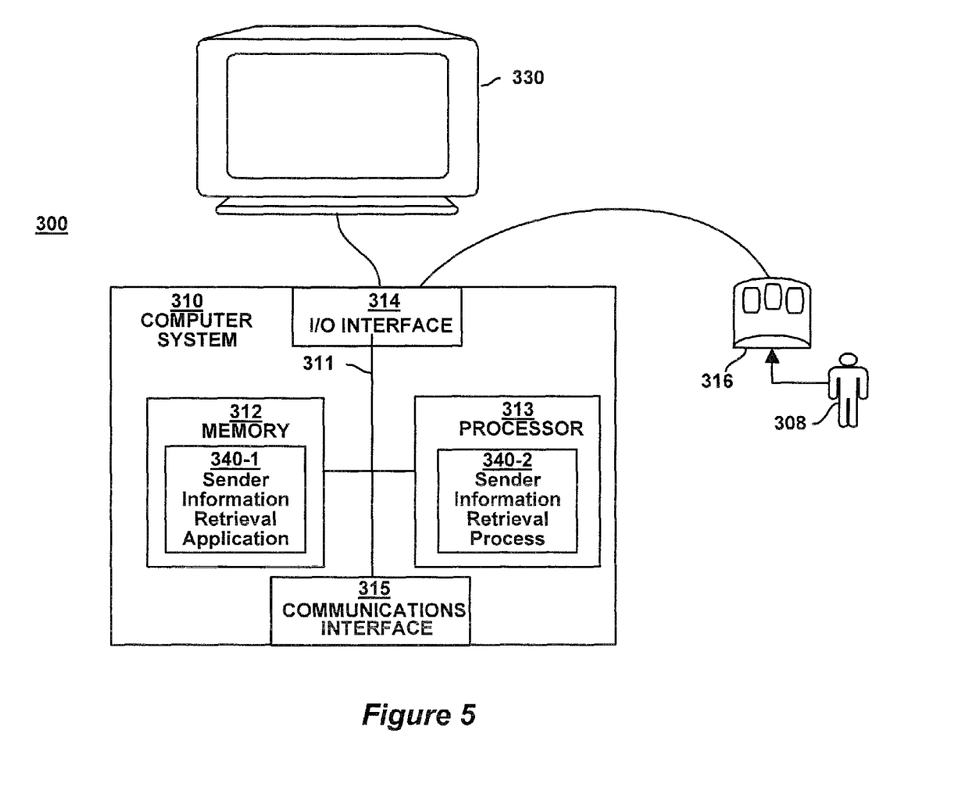
FIG. 5 illustrates an example computer system architecture for a computer system that provides additional information related to a sender of a communication in accordance with embodiments of the invention.

FIG. 5 is a block diagram illustrating an example computer system 100 for implementing sender information retrieval function 140 and/or other related processes to carry out the different functionality as described herein.

As shown, computer system 300 of the present example includes an interconnect 311 that couples a memory system 312 and a processor 313 an input/output interface 314, and a communications interface 315.

As shown, memory system 512 is encoded with sender information retrieval application 540-1. Sender information retrieval application 340-1 can be embodied as software code such as data and/or logic instructions (e.g., code stored in the memory or on another computer readable medium such as a disk) that support functionality according to different embodiments described herein.

During operation, processor 313 of computer system 300 accesses memory system 312 via the interconnect 311 in order to launch, run, execute, interpret or otherwise perform the logic instructions of the sender information retrieval application 340-1. Execution of sender information retrieval application 340-1 produces processing functionality in sender information retrieval process 340-2. In other words, the sender information retrieval process 340-2 represents one or more portions of the sender information retrieval application 340-1 (or the entire application) performing within or upon the processor 313 in the computer system 300.

It should be noted that, in addition to the sender information retrieval process 340-2, embodiments herein include the sender information retrieval application 340-1 itself (i.e., the un-executed or non-performing logic instructions and/or data). The sender information retrieval application 340-1 can be stored on a computer readable medium such as a floppy disk, hard disk, or optical medium. The sender information retrieval application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of sender information retrieval application 340-1 in processor 313 as the persistent security process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing additional information related to a sender of a communication, the method comprising:
receiving a communication intended for a recipient, said communication including information related to said sender of said communication, said communication being an incoming telephone call;
acquiring, in real time by way of a Personal Virtual Assistant (PVA), additional information related to said sender of said communication, wherein said acquiring additional information related to said sender of said communication comprises said PVA acquiring a ranking of said sender of said communication, wherein said rank comprises a relative importance of said sender of said communication, said rank assigned by said recipient, said PVA also acquiring results of a reverse phone lookup, said PVA also executing a web search of the sender;
prior to acting on the incoming telephone call, presenting said additional information related to said sender of said communication to said recipient, said additional information including search results of the web search of the sender, the ranking of the sender, and reverse phone lookup results,
displaying a list of options for acting on the incoming telephone call; and
in response to receiving real time instructions from the recipient, executing said recipient real time instructions via said PVA.

2. The method of claim 1 wherein said communication includes communications answered by said recipient and communications missed by said recipient.

3. The method of claim 1 wherein said acquiring, by way of a Personal Virtual Assistant (PVA), additional information related to said sender of said communication comprises said PVA performing a web-based search of at least one of said sender of said communication and of a company related to said sender of said communication.

4. The method of claim 1 wherein said acquiring, by way of a Personal Virtual Assistant (PVA), additional information related to said sender of said communication comprises accessing an electronic business card (Vcard) of said sender of said communication.

5. The method of claim 1 wherein said acquiring, by way of a Personal Virtual Assistant (PVA), additional information related to said sender of said communication comprises presenting a picture of said sender of said communication.

6. The method of claim 1 wherein said presenting said additional information related to said sender of said communication to said recipient comprises presenting said additional information in a form selected from the group comprising a listing of menu items, a web page, a listing of icons, a table form, and tabs of a web page.

7. The method of claim 1 further comprising allowing said recipient of said communication to select said additional information to review.

8. The method of claim 1 wherein said communication includes at least one of a telephone call, an Instant Message (IM), a text message, and an e-mail.

9. The method of claim 1 further comprising instructions presenting to said recipient any appropriate additional information relating to progress of interaction with said sender of said communication to said recipient.

10. A non-transitory computer readable medium having computer readable code thereon for providing additional information related to a sender of a communication, the medium comprising:
instructions for receiving a communication intended for a recipient, said communication including information related to said sender of said communication, said communication being an incoming telephone call;
instructions for acquiring, in real time by way of a Personal Virtual Assistant (PVA), additional information related to said sender of said communication, wherein said acquiring additional information related to said sender of said communication comprises said PVA acquiring a ranking of said sender of said communication, wherein said rank comprises a relative importance of said sender of said communication, said rank assigned by said recipient, said PVA also acquiring results of a reverse phone lookup, said PVA also executing a web search of the sender;
instructions for,
instructions for, prior to acting on the incoming telephone call, presenting said additional information related to said sender of said communication to said recipient, said additional information including search results of the web search of the sender, the ranking of the sender, and reverse phone lookup results;
instructions for displaying a list of options for acting on the incoming telephone call; and
instructions for, in response to receiving real time instructions from the recipient, executing said recipient real time instructions via said PVA.

11. The computer readable medium of claim 10 wherein said communication includes communications answered by said recipient and communications missed by said recipient.

12. The computer readable medium of claim 10 wherein said instructions for acquiring, by way of a Personal Virtual Assistant (PVA), additional information related to said sender of said communication comprises instructions for said PVA performing a web-based search of at least one of said sender of said communication and of a company related to said sender of said communication.

13. The computer readable medium of claim 10 wherein said instructions for acquiring, by way of a Personal Virtual Assistant (PVA), additional information related to said sender of said communication comprises instructions for accessing an electronic business card (Vcard) of said sender of said communication.

14. The computer readable medium of claim 10 wherein said instructions for acquiring, by way of a Personal Virtual Assistant (PVA), additional information related to said sender of said communication comprises instructions for presenting a picture of said sender of said communication.

15. The computer readable medium of claim 10 wherein said instructions for presenting said additional information related to said sender of said communication to said recipient comprises instructions for presenting said additional information in a form selected from the group comprising a listing of menu items, a web page, a listing of icons, a table form, and tabs of a web page.

16. The computer readable medium of claim 10 further comprising instructions for allowing said recipient of said communication to select said additional information to review.

17. The computer readable medium of claim 10 wherein said communication includes at least one of a telephone call, an Instant Message (IM), a text message, and an e-mail.

18. The computer readable medium of claim 10 further comprising instructions for presenting to said recipient any appropriate additional information relating to progress of interaction with said sender of said communication to said recipient.

19. A computer system comprising:
a memory;
a processor;
a communications interface;
an interconnection mechanism coupling the memory, the processor and the communications interface; and
wherein the memory is encoded with an application providing additional information related to a sender of a communication, that when performed on the processor, provides a process for processing information, the process causing the computer system to perform the operations of:
receiving a communication intended for a recipient, said communication including information related to said sender of said communication, said communication being an incoming telephone call;
acquiring, in real time by way of a Personal Virtual Assistant (PVA), additional information related to said sender of said communication, wherein said acquiring additional information related to said sender of said communication comprises said PVA acquiring a ranking of said sender of said communication, wherein said rank comprises a relative importance of said sender of said communication, said rank assigned by said recipient, said PVA also acquiring results of a reverse phone lookup, said PVA also executing a web search of the sender;
prior to acting on the incoming telephone call, presenting said additional information related to said sender of said communication to said recipient, said additional information including search results of the web search of the sender, the ranking of the sender, and reverse phone lookup results,
displaying a list of options for acting on the incoming telephone call; and
in response to receiving real time instructions from the recipient, executing said recipient real time instructions via said PVA.

20. The method of claim 1 wherein said presenting said additional information related to said sender of said communication to said recipient takes place when said communication arrives at said recipient.

21. The computer readable medium of claim 10 further comprising instructions wherein said presenting said additional information related to said sender of said communication to said recipient takes place when said communication arrives at said recipient.

\* \* \* \* \*